United States Patent [19]

Okuda et al.

[11] Patent Number: 5,609,670

[45] Date of Patent: Mar. 11, 1997

[54] EMULSION INK FOR STENCIL PRINTING

[75] Inventors: Sadanao Okuda; Hideo Watanabe, both of Tokyo, Japan

[73] Assignee: Riso Kagaku Corporation, Tokyo, Japan

[21] Appl. No.: 504,599

[22] Filed: Jul. 20, 1995

[30] Foreign Application Priority Data

Jul. 25, 1994 [JP] Japan ................................. 6-172837

[51] Int. Cl.⁶ ..................................................... C09D 11/02
[52] U.S. Cl. ................... 106/20 R; 106/20 C; 106/27 R; 106/28 R; 106/32
[58] Field of Search ............................... 106/20 R, 20 C, 106/27 R, 28 R, 32

[56] References Cited

U.S. PATENT DOCUMENTS

| | | | |
|---|---|---|---|
| 3,421,910 | 1/1969 | Gilson et al. | 106/32 |
| 3,823,020 | 7/1974 | Gilson et al. | 106/23 E |
| 4,981,517 | 1/1991 | DeSanto, Jr. et al. | 106/30 R |
| 5,047,084 | 9/1991 | Miller et al. | 106/27 R |
| 5,378,739 | 1/1995 | Koike et al. | 106/30 R |
| 5,389,130 | 2/1995 | Batlaw et al. | 106/30 R |
| 5,395,435 | 3/1995 | Mizobuchi | 106/28 R |

FOREIGN PATENT DOCUMENTS

| | | |
|---|---|---|
| 148006 | 7/1985 | European Pat. Off. . |
| 60-96672 | 5/1985 | Japan . |
| 3-313335 | 11/1991 | Japan . |
| 4-88251 | 3/1992 | Japan . |

*Primary Examiner*—Helene Klemanski
*Attorney, Agent, or Firm*—Fay, Sharpe, Beall, Fagan, Minnich & McKee

[57] ABSTRACT

An emulsion ink for a stencil printing is disclosed which has a water phase in an oil phase and preferably contains a water-insoluble colorant dispersed in the water phase with a tertiary amine compound.

6 Claims, No Drawings

EMULSION INK FOR STENCIL PRINTING

BACKGROUND OF THE INVENTION

1. Field of the Invention

The present invention relates to an emulsion ink for a stencil printing (hereinafter referred to as stencil printing emulsion ink). More specifically, the present invention relates to a stencil printing emulsion ink which has an excellent emulsion stability, drying property, and temperature suitability, has a high print concentration when printed, and has a reduced bleeding and strike through.

2. Description of the Prior Art

In a stencil printing, first a plate-making is carried out by using a stencil printing sheet having perforated portions and then an ink is extruded through the perforated portions to print the surface of a body such as a piece of paper to be printed. This stencil printing is easy in preparation of the plate-making and, thus, used in diversified applications.

As for the stencil printing, water-in oil (W/O) type emulsion ink is generally used, and a pigment is contained as colorant (coloring agent) in the oil phase of W/O type emulsion ink (Unexamined Japanese Patent Publication Nos. 61-255967, 64-14284, 4-132777, and 5-117565).

When W/O type emulsion ink is printed on the surface of a body such as a paper to be printed, an oil phase which is an outer phase of the emulsion will first permeates into the body and then a water phase which is an inner phase of the emulsin will permeates into the body or splash on the body.

Since the pigment is contained in the oil phase in conventional W/O type emulsin ink, the permeation of the ink is slow.

A resin component is contained in the oil phase in conventional W/O type emulsion ink for dispersing the pigment in the oil phase and for improving the fixation of the pigment on the surface of the body. However, a high molecular compound ia generally used as the resin component in the prior art, and thus, the permeation of the ink becomes slow; the bleeding of the ink is liable to occur even it permeated; ink components such as a pigment permeates into the inner part of the body; and the striking through of the ink readily occurs.

Further, the viscosity stability of the ink to temperature fluctuation is difficult to secure since the resin component contained in the oil phase suffers a large viscosity change to temperature.

On the other hand, while it is necessary to use a dispersant (dispersing agent) to stably and finely disperse a water-insoluble colorant such as a pigment in the water phase, emulsion is liable to be collapsed or broken and thus a stable W/O type emulsion ink can not be obtained when the dispersant exists in the water phase.

SUMMARY OF THE INVENTION

An object of the present invention is to provide a stencil printing emulsion ink which solves the problems mentioned above, improves the emulsion stability, drying property, and temperature suitability of the ink, and has a high print concentration when printed on the body to be printed, a reduced bleeding and a reduced strike through of the ink.

The present invention relates to a stencil printing emulsion ink having a water phase in an oil phase and containing a tertiary amine compound in the water phase.

DESCRIPTION OF THE PREFERRED EMBODIMENTS

The amine compound is preferably a water-soluble macromolecular compound.

In the emulsion ink of the present invention, a water-insoluble colorant may be contained in the oil phase and/or water phase. However, it is preferably dispersed in the water phase with the tertiary amine compound.

Further, it is preferable that the oil phase in the stencil printing emulsion ink of the present invention does not contain a resin component.

Since the components of the oil phase (outer phase) in the W/O type emulsion ink has a higher permeability and lower surface tension than the components of the water phase (inner phase), the oil phase components permeate into the body to be printed in advance of the water phase components, and then the water phase components permeate into the body or splash on the body.

Since the W/O type emulsion ink of the present invention contains a water-insoluble colorant preferably in the water phase, it is not necessary to add a water-insoluble colorant itself or a resin component for dispersing the water-insoluble colorant in the oil phase or for fixing the water-insoluble colorant to the body. Accordingly, the permeation of the oil phase components in the body to be printed is not disturbed; the permeability of the ink is improved; and the drying property of the ink is also improved.

Further, since it is not necessary to add a resin component in the oil phase, the temperature dependency of the ink can be reduced and thus the supply of inks which are stable to temperature fluctuation becomes possible.

On the other hand, the water phase components become difficult to permeate into the interior of the body to be printed and are kept on the surface of the body and dried thereon.

The bleeding of the ink occurs due to the capillary phenomenon of the body to be printed. In this connection, the water phase components become difficult to permeate into the body since the oil phase components permeate due to the capillary phenomenon in advance of the water phase components.

As the result, the print concentration on the surface of the body to are increased and the strike through and bleeding of the ink are prevented in the present invention.

By using a tertiary amine compound as a dispersant, it becomes possible to finely and stably disperse the water-insoluble colorant in the water phase to improve the image properties and to obtain a W/O type emulsion ink excellent in emulsion stability.

When conventional macromolccular compounds which have a functional group such as a carboxyl group and sulfonic group in the molecule and thus are adsorbed on the surface of pigments are used, collapse or break of the emulsion is liable to occur. This is considered to be based on the fact that conventional high molecular compounds are adsorbed on the interface between the oil phase and water phase and thus the stability of the emulsion is remarkably decreased.

The tertiary amine compound used in the present invention has in the molecule one or more linkages represented by the following formula:

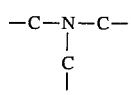

Specific examples of the tertiary amine compound include the followings:

Polyvinylpyrrolidone

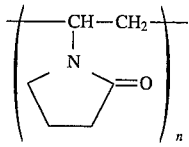

Polyethylenimine

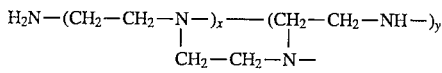

Alkylolamine salt

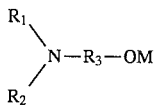

wherein $R_1$, $R_2$, and $R_3$ represent the same or different alkyl groups, and M represents a metal salt, and Poly—N-acryloylpyrrolidine

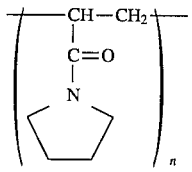

The amount of the tertiary amine compound to be used in the present invention is not specifically limited. However, since the tertiary amine compound is preferably a macromolecular compound, its thickening effect becomes remarkably high when the amount to be used is increased. In such a case, the amount of the dispersant is preferably decided at an appropriate amount according to the type of dispersant since the dispersant to be used is sufficient at a minimum amount at which the water-insoluble colorant can be finely and stably dispersed in the water phase.

Specifically, the amount of the tertiary amine compound to be added in the present invention is preferably 0.1 to 10% by weight, more preferably 0.3 to 3% by weight based on the total weight of the emulsion ink, when it is used particularly for dispersing the water-insoluble colorant.

The type of the water-insoluble colorant used in the present invention is not particularly restricted, and conventional pigments can be used. However, pigments which have a good affinity to water (a main solvent) are preferably used.

Specific examples of the colorant include carbon black such as a furnace carbon black, lamp black, acetylene black, and channel black, for monochrome color, metals or metal oxides such as copper, iron, titanium oxide, and calcium carbonate, and organic pigments such as an azo, cyanine, dioxazine, or quinacridone type pigment.

Average particle diameter of the water-insoluble colorant is preferably less than 10 μm and more preferably less than 3 μm from the view point of preventing the emulsion from collapsing.

The amount of the water-insoluble colorant to be added is preferably 1 to 30% by weight and more preferably 3 to 10% by weight based on the total weight of the emulsion.

In the water phase of the emulsion in the present invention, an oil in water (O/W) type resin emulsion and/or a water-soluble resin is preferably added. By the addition of the O/W emulsion and/or water-soluble resin into the water phase, the fixing property of the water-insoluble colorant to a body such as a piece of paper to be printed can be improved.

The O/W type resin emulsion includes resin emulsions containing a polyvinyl acetate, ethylene-vinyl acetate copolymer, vinyl acetate-acrylic ester copolymer, polymethacrylate, polystyrene, styrene-acrylic ester copolymer, styrene-butadiene copolymer, vinylidene chloride-acrylic ester copolymer, polyvinyl chloride, vinylchloride-vinyl acetate copolymer, or polyurethane.

The water-soluble resin includes a polyvinyl alcohol, methyl cellulose, carboxymethyl cellulose, hydroxymethyl cellulose, polyvinyl pyrrolidone, ethylene-vinyl alcohol copolymer, polyethylene oxide, polyvinyl ether, polyacrylamide, gum arabic, starch, and water-soluble polyurethane.

The amount of these resin components to be added is preferably less than 20% by weight and more preferably less than 10% by weight in terms of solid component based on the total weight of the emulsion ink.

When the amount of the resin component to be added exceeds 20% by weight, the ink may form a film on the perforated portions on a stencil when the stencil was left as it was for a long period of time after the plate-making, and the film may prevent the passage of the ink.

A water-soluble additive such as a wetting agent, electrolyte, mildewproofing agent, antioxidant, agent for preventing water evaporation may be added to the water phase, if necessary.

The oil phase in the present invention may contain a nonvolatile solvent, a volatile solvent, or an emulsifier.

The nonvolatile solvent includes a mineral oil such as a motor oil, spindle oil, machine oil, and liquid paraffin, and a vegetable oil such as an olive oil, a castor oil, a salad oil.

The volatile solvent includes a known mineral oil type solvent and vegetable type solvent. The ratio of these solvents (nonvolatile solvent/volatile solvent) to be used is different depending on the ratio of the oil phase to water phase, but it is preferably in the range of 50–95/50–5 by weight.

An emulsifier is used for forming a W/O type emulsion, and a nonionic surface active agent is preferably used. As the surface active agent, sorbitan higher fatty acid esters such as sorbitan monolaurate, sorbitan monopalmitate, sorbitan monostearate, sorbitan tristearate, sorbitan monooleate, and sorbitan sesquioleate, fatty acid monoglycerides, fatty acid diglycerides, ethylene oxide adducts, for example, of higher alcohols, alkyl phenols, fatty acids can be exemplified.

The W/O type emulsion ink of the present invention can be produced by gradually adding 90 to 30% by weight of the water phase components to 10 to 70% by weight of the oil phase components to form an emulsion.

According to the present invention, a W/O type emulsion ink which can provide a high print concentration, and has a reduced strike through and bleeding of the ink can be obtained since the ink contains a water-insoluble colorant in its water phase. Also, according to the present invention, a W/O type emulsion ink which is excellent in the aptitude to emulsification and dispersibility can be obtained since the water-insoluble colorant is dispersed in the water phase with a tertiary amine compound.

Further, the emulsion ink of the present invention does not need to disperse in its oil phase a resin component for improving the dispersibility and fixability of a colorant since a colorant does not exist in the oil phase. Thus, according to the present invention, a W/O type emulsion ink having an improved permeability to bodies to be printed and drying ability of the ink, and having a reduced viscosity change to temperature fluctuation can be obtained.

EXAMPLES

The detailed description of the present invention will be given below with reference to the accompanying Examples and Comparative Examples. It should be understood, however, that these Examples do not limit any scope of the present invention. In the Examples and Comparative Examples, parts indicate parts by weight.

Example 1

A W/O type emulsion ink was prepared by the following method by using the formulation shown in Table 1:

Deionized water, ethylene glycol, furnace carbon black, and plyvinylpyrrolidone (produced by BASF; Tradename: Luviskol K17) as a dispersing agent were fully stirred and dispersed by a ball mill.

Polyacrylic acid ester (emulsion type) was added to the dispersion and the mixture was stirred again to prepare a water phase.

Then, motor oil No. 40, Nisseki Solvent No. 5, and sorbitan monooleate were fully stirred to prepare an oil phase.

The resulting oil phase was emulsified using a stirrer by gradually adding the water phase to the oil phase to give a stencil printing emulsion ink.

Examples 2 to 4

Following the procedure similar to that in Example 1, three kinds of stencil printing emulsion ink were prepared except that polyethylene imine (produced by NIPPON SHOKUBAI CO., LTD.; Tradename:Epomin SP-012), alkylolamine salt (produced by BYK Chemie Japan; Tradename: Disperbyk-181), or poly-N-acryloylpyrrolidine was used in the formulation shown in Table 1.

Comparative Example 1

A W/O type emulsion ink was prepared by the following method using the formulation shown in Table 1:

An alkyd resin, furnace carbon black, motor oil No. 40, Nisseki Solvent No. 5, and sorbitan monooleate were fully stirred and then fully kneaded with triple rollers to prepare an oil phase.

Subsequently, a mixed solution of deionized water with ethylene glycol was gradually added with stirring to the oil phase to obtain a stencil printing emulsion ink.

Comparative Examples 2 to 4

Example 1 was repeated except that one of the following dispersants was used to obtain three kinds of stencil printing ink:

Comparative Example 2

Sulfonic acid type high molecular compound (produced by Kao Corporation; Tradename: Demol RN)

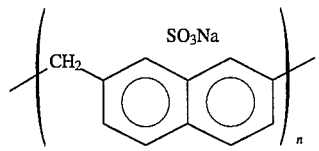

(Polycondensation product of naphthalenesulfonic acid with formalin)

Comparative Example 3

Carboxylic acid type high molecular compound (produced by B. F. Goodrich; Tradename: Carbopol 910)

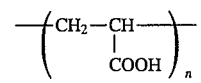

Comparative Example 4

Cellulose type high molecular compound (produced by Shin-Etsu Chemical Co., Ltd.; Tradename Metolose SM 25)

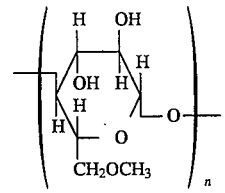

(Methyl cellulose)

TABLE 1

| W/O type emulsion ink composition (parts by weight) | | | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|---|---|
| Oil phase | Nonvolatile solvent | Motor oil No. 40 | 13.0 | 13.0 | 13.0 | 13.0 | 8.0 | 13.0 | 13.0 | 13.0 |
| | Volatile | Nisseki solvent No. | 3.0 | 3.0 | 3.0 | 3.0 | 3.0 | 3.0 | 3.0 | 3.0 |

TABLE 1-continued

| W/O type emulsion ink composition (parts by weight) | | | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|---|---|
| | solvent | 5 | | | | | | | | |
| | Emulsifier | Solbitan mooleate | 2.0 | 2.0 | 2.0 | 2.0 | 2.0 | 2.0 | 2.0 | 2.0 |
| | Resin | Alkyd resin | — | — | — | — | 10.0 | — | — | — |
| | Water-insoluble colorant*¹ | Furnace carbon black | — | — | — | — | 4.0 (0.5) | — | — | — |
| Water phase | Water-insoluble colorant*¹ | Furnace carbon black | 4.0 (0.1) | 4.0 (0.2) | 4.0 (0.1) | 4.0 (0.3) | — | 4.0 (0.1) | 4.0 (12.0) | 4.0 (0.1) |
| | Water | Deionized water | 66.0 | 71.0 | 66.0 | 71.0 | 67.0 | 66.0 | 61.0 | 71.0 |
| | Dispersant | *² | 1.0 | 1.0 | 1.0 | 1.0 | — | 1.0 | 1.0 | 1.0 |
| | O/W type resin emulsion | Polyacrylic ester (solid content: 50%) | 5.0 | — | 5.0 | — | — | 5.0 | 10.0 | — |
| | Wetting agent | Ethylene glycol | 6.0 | 6.0 | 6.0 | 6.0 | 6.0 | 6.0 | 6.0 | 6.0 |

*¹( ) indicates an average particle diameter (μm) determined by using a centrifugal particle size measuring apparatus (CAPA-700 manufactured by Horiba Co., Ltd.).
*²Type of dispersant:
Example 1 Polyvinylpyrrolidone
Example 2 Polyethylene imine
Example 3 Alkylolamine salt
Example 4 Poly-N-acryloylpyrrolidine
Comparative Example 1 None
Comparative Example 2 Sulfonic acid type high molecular compound
Comparative Example 3 Carboxylic acid type high molecular compound
Comparative Example 4 Cellulose type high molecular compound

[Tests of the emulsion ink]

By using each of the stencil printing emulsion ink obtained in Examples 1 to 4 and Comparative Examples 1 to 4, stencil printing were carried out by means of a stencil printing machine, Risograph RC115D (Registered Trademark; product of Riso Kagaku Corporation). Tests were made for aptitude to emulsification and dispersion property of the inks as well as print concentration on printed matters, strike through property, bleeding property, and temperature suitability of the ink, and the results thus obtained are given in Table 2. The properties were determined by the methods as follows:

(1) Aptitude to emulsification: The ink which was not separated into the oil phase and water phase at the time of printing with a printing machine immediately after the ink preparation was graded as o (circle), but the ink separated was graded as X (crossing mark).

(2) Dispersion stability: After the ink was left at 70° C. for one month, the ink's collapsing condition was visually observed and the evaluation was made by marking with o for the case when the emulsion ink was not collapsed and with X for the case when it was collapsed.

(3) Print concentration: The print concentration in the printed set-solid portion was determined by an OD meter (RD 920 produced by Makbeth Co.)

(4) Strike through property: The concentration on the rear surface side of the printed set-solid portion was determined by the OD meter (the same as above).

(5) Bleeding property: The bleeding conditions of the portion attached with the ink was observed using a microscope at a magnification of X80. In the case when the bleeding was almost none, the sign of o was given, and the X was given for the case when the bleeding was remarkable.

(6) Temperature suitablility: A stencil printing was carried out at a low temperature (5° C.), and the print concentration in the set-solid portion printed was determined by the OD meter (the same above).

TABLE 2

| | Examples | | | | Comparative Examples | | | |
|---|---|---|---|---|---|---|---|---|
| | 1 | 2 | 3 | 4 | 1 | 2 | 3 | 4 |
| Aptitude to emulsification | O | O | O | O | O | O | O | X |
| Dispersion stability | O | O | O | O | O | X | X | X |
| Print concentration | 1.18 | 1.15 | 1.20 | 1.13 | 1.08 | 1.18 | 1.08 | —*¹ |
| Strike through | 0.15 | 0.11 | 0.15 | 0.14 | 0.21 | 0.16 | 0.11 | —*¹ |
| Bleeding | O | O | O | O | X | O | O | —*¹ |
| Temperature suitability | 1.14 | 1.09 | 1.11 | 1.05 | 0.88 | 1.13 | 0.96 | —*¹ |

*¹Evaluation for printing was unable to perform since the emulsion ink was separated into the oil phase and water phase at the time when printing was conducted after the ink was charged in a printing machine.

From Table 2, it was found that in Examples 1 to 4, each emulsion ink had a high print concentration, was excellent in strike through property and bleeding, and showed less influence on the print concentration even if a low temperature printing was carried out, in comparison with those of Comparative Examples 1.

In Comparative Examples 2 to 4, a water-insoluble colorant was dispersed in the water phase, but tertiary amine was not used. Thus, the ink of Comparative Examples 2 to 4 were found to readily be separated into the oil phase and water phase and to be unstable such that they can not be left for a long period of time.

What we claimed is:

1. An emulsion ink for stencil printing having a water phase in an oil phase, wherein said water phase contains a macromolecular compound having a tertiary amino group and has a water-insoluble colorant dispersed therein.

2. The emulsion ink for stencil printing according to claim 1 wherein said macromolecular compound having a tertiary amino group is water-soluble.

3. The emulsion ink for stencil printing according to claim 1 wherein said water-insoluble colorant is dispersed in said water phase with said macromolecular compound.

4. The emulsion ink for stencil printing according to claim 1 wherein said water-insoluble colorant has an average particle diameter of less than 10 μm.

5. The emulsion ink for stencil printing according to claim 1 wherein said water phase contains an oil-in-water resin emulsion, a water-soluble resin, or a mixture thereof.

6. The emulsion ink for stencil printing according to claim 1 wherein said oil phase does not contain a resin component.

* * * * *